US011458679B2

(12) United States Patent
Abbott, Jr. et al.

(10) Patent No.: US 11,458,679 B2
(45) Date of Patent: Oct. 4, 2022

(54) LIGHTING FOR ADDITIVE MANUFACTURING

(71) Applicant: Hewlett-Packard Development Company, L.P., Houston, TX (US)

(72) Inventors: James Elmer Abbott, Jr., Albany, OR (US); Alexander Govyadinov, Corvallis, OR (US); Vladek Kasperchik, Corvallis, OR (US); Krzysztof Nauka, Palo Alto, CA (US); Sivapackia Ganapathiappan, Los Altos, CA (US); Lihua Zhao, Sunnyvale, CA (US); Howard S. Tom, Jr., San Jose, CA (US); Yan Zhao, Palo Alto, CA (US); Hou T. Ng, Campbell, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 924 days.

(21) Appl. No.: 15/513,965

(22) PCT Filed: Sep. 26, 2014

(86) PCT No.: PCT/US2014/057651
§ 371 (c)(1),
(2) Date: Mar. 23, 2017

(87) PCT Pub. No.: WO2016/048348
PCT Pub. Date: Mar. 31, 2016

(65) Prior Publication Data
US 2017/0361505 A1 Dec. 21, 2017

(51) Int. Cl.
*B29C 64/165* (2017.01)
*B33Y 30/00* (2015.01)
(Continued)

(52) U.S. Cl.
CPC ........ *B29C 64/165* (2017.08); *B29C 35/0805* (2013.01); *B29C 64/264* (2017.08);
(Continued)

(58) Field of Classification Search
CPC ... B29C 64/264; B29C 64/268; B29C 64/277; B29C 71/04; B29C 64/282
(Continued)

(56) References Cited

U.S. PATENT DOCUMENTS 5,942,370 A   8/1999 Neckers
6,531,086 B1  3/2003 Larsson
(Continued)

FOREIGN PATENT DOCUMENTS

CN   1950192    4/2007
CN   101180174  5/2008
(Continued)

OTHER PUBLICATIONS

PhlatLight LED Illumination Products Product Datasheet pp. 5-8, May 2011.*
(Continued)

*Primary Examiner* — Philip C Tucker
*Assistant Examiner* — Jimmy R Smith, Jr.
(74) *Attorney, Agent, or Firm* — Dierker & Kavanaugh PC (57) ABSTRACT

In one example, a lighting device for an additive manufacturing machine includes an array of light sources each to emit monochromatic light within a band of wavelengths that includes a peak light absorption of a liquid coalescing agent to be dispensed on to a build material.

13 Claims, 12 Drawing Sheets

(51) Int. Cl.
    *B29C 64/291*      (2017.01)
    *B29C 64/277*      (2017.01)
    *B29C 64/264*      (2017.01)
    *B29C 64/268*      (2017.01)
    *B29C 35/08*      (2006.01)
    *B29C 67/00*      (2017.01)
    *B33Y 10/00*      (2015.01)
    *B29C 64/205*      (2017.01)
    *B29C 64/209*      (2017.01)

(52) U.S. Cl.
    CPC .......... *B29C 64/268* (2017.08); *B29C 64/277* (2017.08); *B29C 64/291* (2017.08); *B29C 67/0007* (2013.01); *B33Y 30/00* (2014.12); *B29C 64/205* (2017.08); *B29C 64/209* (2017.08); *B29C 2035/0838* (2013.01); *B33Y 10/00* (2014.12)

(58) Field of Classification Search
    USPC .............................................. 425/174, 174.4
    See application file for complete search history.

(56) References Cited

U.S. PATENT DOCUMENTS

| | | |
|---|---|---|
| 6,658,314 B1 | 12/2003 | Gothait |
| 6,849,308 B1 | 2/2005 | Speakman et al. |
| 8,686,062 B1 | 4/2014 | Farrugia et al. |
| 9,505,238 B2 * | 11/2016 | Andrea-Tallada ..... B41J 11/002 |
| 2006/0134419 A1 | 6/2006 | Monsheimer et al. |
| 2006/0180957 A1 * | 8/2006 | Hopkinson ............. B29C 67/02 |
| | | 264/405 |
| 2007/0238056 A1 | 10/2007 | Baumann et al. |
| 2011/0259862 A1 | 10/2011 | Scott et al. |
| 2012/0139167 A1 | 6/2012 | Fruth et al. |
| 2014/0052288 A1 | 2/2014 | El-Siblani et al. |
| 2014/0079841 A1 | 3/2014 | Pridoehl et al. |
| 2016/0033756 A1 * | 2/2016 | Miller ................. G02B 26/0833 |
| | | 355/67 |
| 2016/0067780 A1 * | 3/2016 | Zediker ................. B29C 64/153 |
| | | 219/76.12 |

FOREIGN PATENT DOCUMENTS

| | | |
|---|---|---|
| CN | 103921444 | 7/2014 |
| JP | 2002316363 | 10/2002 |
| KR | 1020130013490 | 2/2013 |
| WO | WO-0138061 | 5/2001 |
| WO | WO 2013021173 | 2/2013 |
| WO | WO 2013024297 | 2/2013 |
| WO | WO-2013167415 A1 | 11/2013 |

OTHER PUBLICATIONS

Vaezi, Mohammad, et al., "A review on 3D micro-additive manufacturing technologies", Int J Adv Manuf Technol (2013) 67:1721-1754.

International Search Report and Written Opinion for International Application No. PCT/US2014/057651 dated Jun. 18, 2015, 13 pages.

* cited by examiner

LIGHTING FOR ADDITIVE MANUFACTURING

BACKGROUND

Additive manufacturing machines produce 3D (three-dimensional) objects by building up layers of material. Some additive manufacturing machines are commonly referred to as "3D printers" because they often use inkjet or other printing technology to apply some of the manufacturing materials. 3D printers and other additive manufacturing machines make it possible to convert a CAD (computer aided design) model or other digital representation of an object directly into the physical object.

DRAWINGS

The same part numbers designate the same or similar parts throughout the figures.

DESCRIPTION

Additive manufacturing machines make a 3D object through the solidification of one or more layers of a build material. Additive manufacturing machines make objects based on data in a 3D model of an object generated, for example, with a CAD computer program product. The model data is processed into slices each defining that part of a layer or layers of build material to be solidified. Examples of additive manufacturing described below use a technique sometimes referred to as "light area processing" (LAP) in which an ink or other suitable coalescing agent is dispensed on to a layer of build material in the desired pattern and then exposed to light. Light absorbing components in the coalescing agent absorb light to generate heat that sinters, melts or otherwise coalesces the patterned build material, allowing the patterned build material to solidify.

LAP heating may occur in two steps. First, the build material is heated to and maintained at temperature just below its coalescing temperature, for example with a combination of resistive heaters and a lower intensity heater lamp. Second, a coalescing agent is "printed" or otherwise dispensed on to the build material in the desired pattern and exposed to a higher intensity coalescing lamp emitting light absorbed into the patterned build material. Presently, halogen lamps emitting light over a broad spectrum are usually used in both steps. Accordingly, carbon black ink is often used as the coalescing agent to absorb light over a broad spectrum to generate enough heat to effectively coalesce the patterned build material. The use of black ink, however, limits the color of the manufactured objects to black and grey.

A variety of different color objects may be manufactured with LAP using colored and colorless inks that have high light absorption within a narrow band of wavelengths. Colorless inks that absorb only infrared light may be particularly desirable coalescing agents because they enable manufacturing objects that are the same color as the starting build material. The colorless dyes described in the international patent applications filed by Hewlett-Packard Development Company in September 2014 under serial nos. PCT/US2014/057882 and PCT/US2014/057863 and titled 3-Dimensional Printing, for example, have been developed for use as ink based LAP coalescing agents. Broad band halogen lamps, however, may be inadequate for heating build material patterned with colored and colorless inks because only a small portion of the light emitted falls within the band of wavelengths where high light absorption occurs, and thus the amount of absorbed radiative energy may be inadequate to heat the patterned build material to a coalescing temperature. In addition, light emitted outside this band of wavelengths may have undesirable heating effects.

New LAP lighting techniques have been developed to manufacture color objects (other than black and grey) using color and colorless coalescing agents, including the colorless dyes described in the PCT/US2014/057882 and PCT/US2014/057863 patent applications. Examples of the new techniques utilize monochromatic light covering the peak light absorption of the coalescing agent to develop the heat needed to reach coalescing temperatures. In one example, an additive manufacturing process includes dispensing a liquid coalescing agent on to build material in a pattern corresponding to an object slice and then exposing the patterned build material to monochromatic light within a band of wavelengths that includes a peak light absorption of the coalescing agent. Although the intensity of the monochromatic light needed for adequate heating may vary depending on the characteristics of the build material and coalescing agent, it is expected that monochromatic light with a spectral intensity at least $1 \times 10^{12} \mathrm{Wm}^{-3}\mathrm{sr}^{-1}$ (watts per cubic meter per steradian) will be sufficient for many implementations.

In another example, a carriage assembly for an additive manufacturing machine carries an array of individually addressable monochromatic light sources along with an inkjet printhead to dispense the coalescing agent. Individual light sources may be energized selectively to illuminate only patterned build material to limit unwanted effects on surrounding build material and to reduce power consumption. Also, the array may include a single set of monochromatic light sources (only one wavelength band) corresponding to a coalescing agent with an absorption peak within the band, or multiple sets of light sources (multiple wavelength bands) to accommodate a greater range of coalescing agents. The use of a monochromatic lighting array enables an integrated carriage assembly to carry both the printhead(s) and the light sources for immediate, targeted lighting.

The electronic instructions to control monochromatic lighting in an additive manufacturing machine may reside on a processor readable medium implemented, for example, in a CAD computer program product, in an object model processor, or in the controller for the additive manufacturing machine.

These and other examples described below and shown in the figures illustrate but do not limit the scope of this disclosure, which is defined in the Claims following this Description.

As used in this document: "coalesce" means to become a coherent mass by heating, for example by sintering or melting; a "coalescing agent" means a substance that causes or helps cause a build material to coalesce; a "coalescence modifier agent" means a substance that inhibits or prevents coalescence of a build material, for example by modifying the effect of a coalescing agent; "monochromatic" means within a band of wavelengths 30 nm or narrower; "polychromatic" means a band of wavelengths broader than 30 nm; and a "slice" means one or more slices of a multi-slice object or the object itself for a single slice object.

Figure 1:
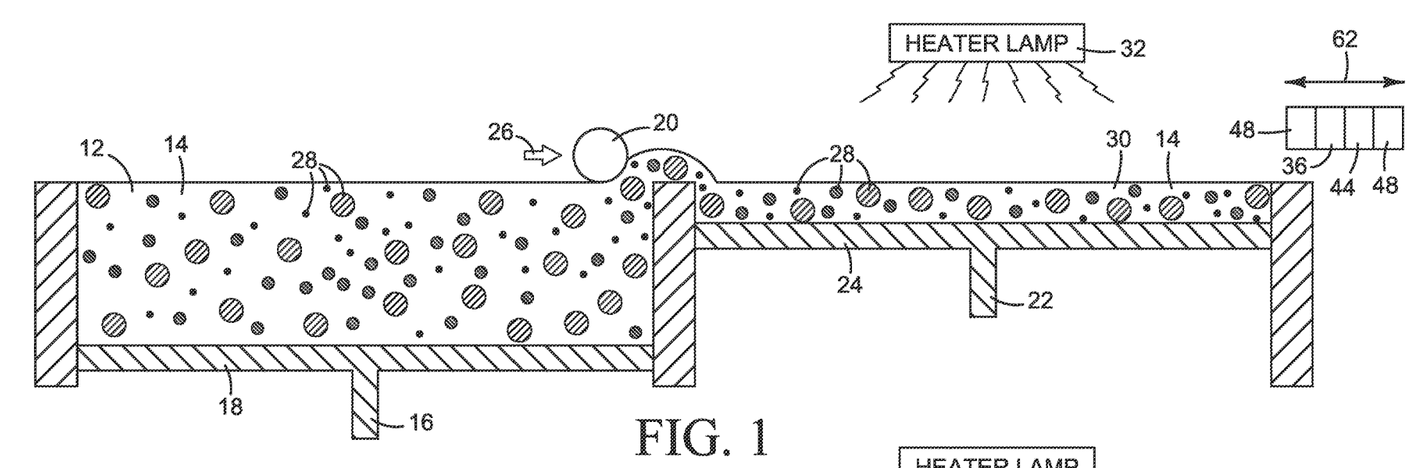
FIGS. 1-9 present a sequence of sections illustrating one example for additive manufacturing a two slice object.
Figure 7:
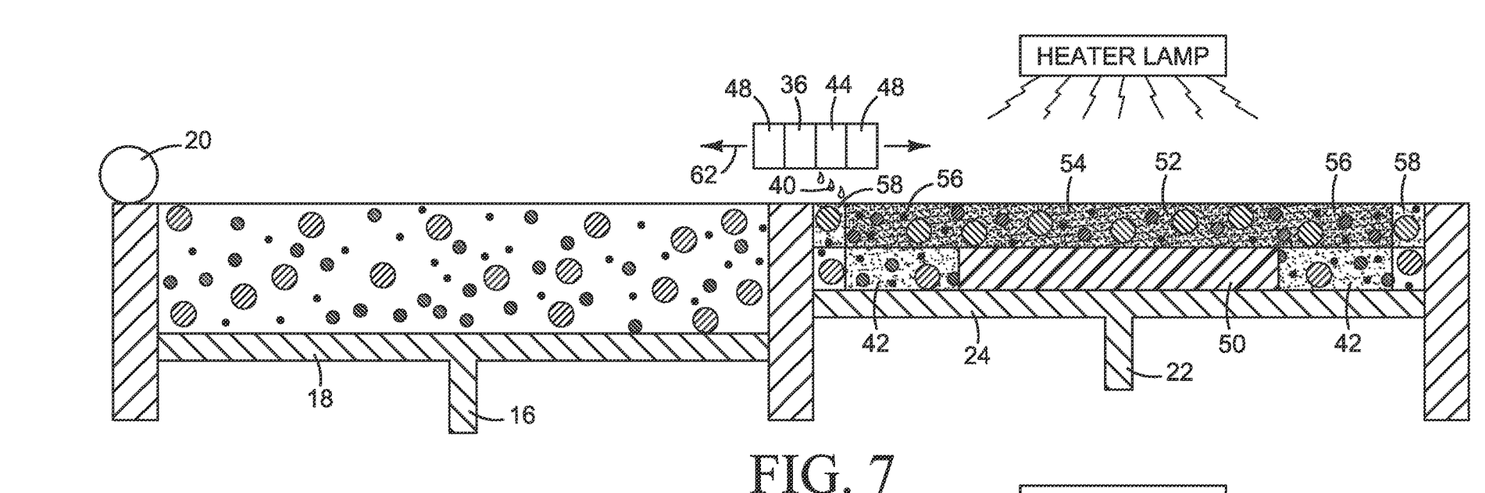
Figure 8:
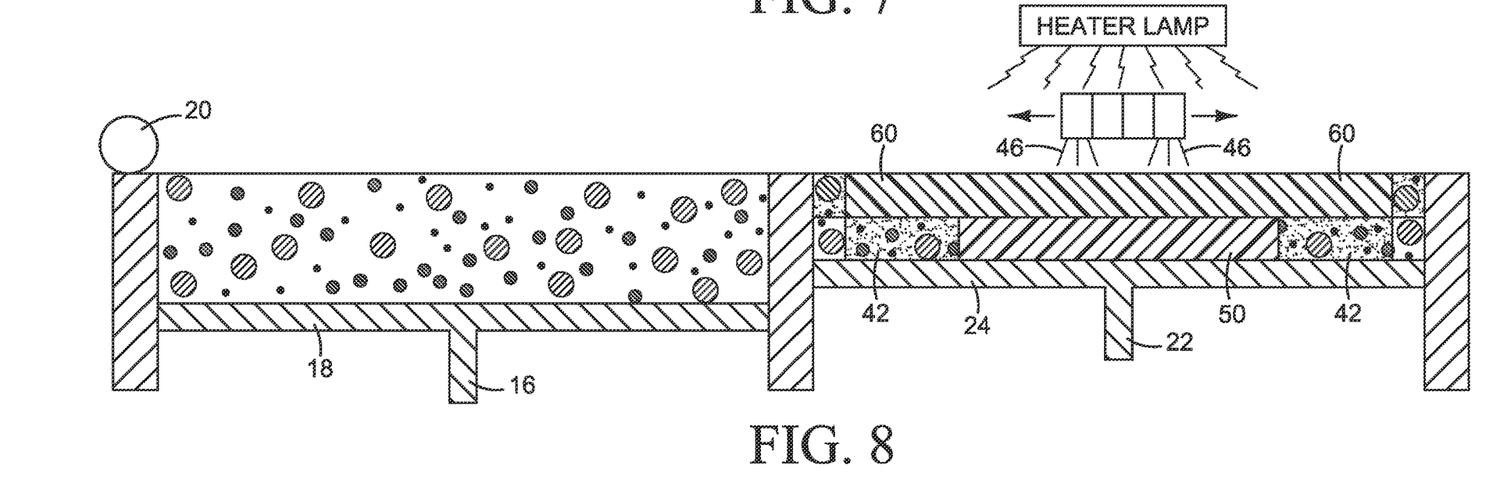
Figure 9:
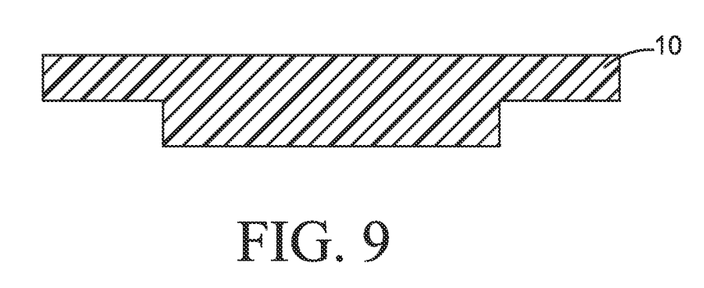
Figure 10:
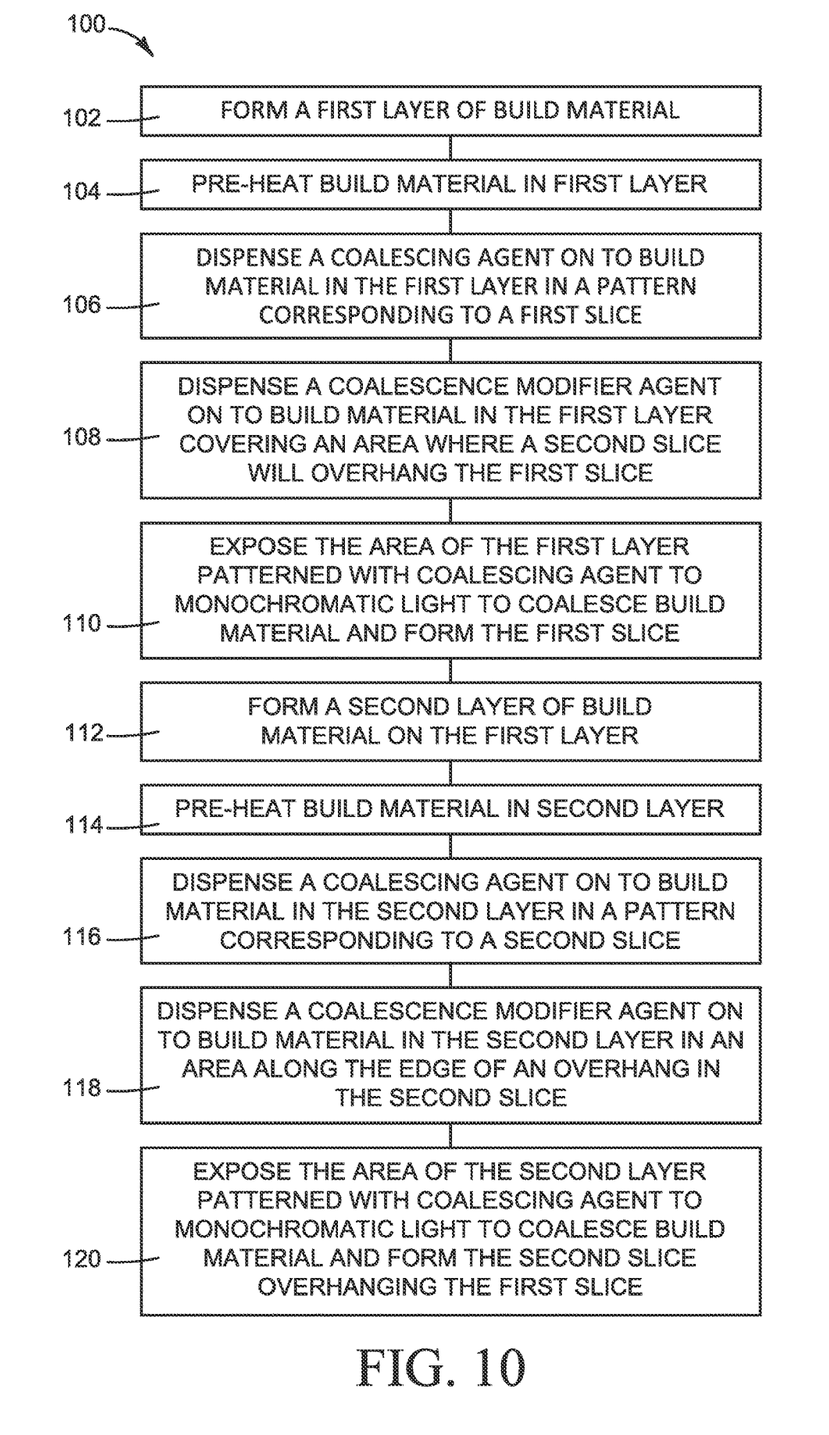
FIGS. 10-13 are flow diagrams illustrating example additive manufacturing processes.
Figure 11:
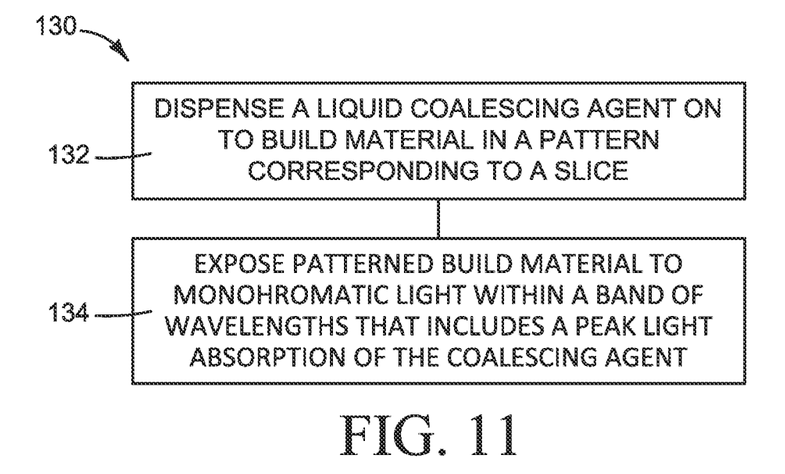

The sequence of sections presented in FIGS. 1-9 illustrate one example for manufacturing a three dimensional object 10 shown in FIG. 9. FIGS. 10 and 11 are flow diagrams illustrating example additive manufacturing processes 100 and 130, respectively, implemented in the example of FIGS. 1-9. Referring first to FIG. 1, in this example a supply 12 of powdered build material 14 is held on a delivery piston 16 in a supply bed 18. A roller or other suitable layering device 20 moves build material 14 from supply bed 18 to a receiving piston 22 in a manufacturing bed 24, as indicated by arrow 26. Pistons 16 and 22 move up and down, respectively, as build material 14 is moved from supply bed 18 to manufacturing bed 24. Any suitable build material 14 may be used to make the desired solid object, which may be hard or soft, rigid or flexible, elastic or inelastic. Also, while a powdered build material 14 is depicted by particles 28 in this example, suitable non-powdered build materials could be used.

Referring now also to FIG. 10, a first layer 30 of build material 14 is formed in manufacturing bed 24 as shown in FIG. 1 (block 102 in FIG. 11). In some implementations, it may be desirable to pre-heat build material 14, particularly in the first few layers, to help keep each layer flat during coalescence and solidification. Individual layers of build material 14 may be pre-heated in manufacturing bed 24, as shown in FIG. 1 (block 104 in FIG. 10), or build material 14 may be pre-heated in supply bed 18, or a combination of heating in both beds 18 and 24. "Pre-heating" in this context refers to heating before light is applied to coalesce build material for coalescence, as described below with reference to FIG. 4. While the pre-heating temperature will vary depending on the characteristics of build material 14, the pre-heating temperature usually will be 20° C. to 50° C. below the melting point or the sintering point for a nylon 12 powdered build material. Any suitable heater 32 may be used. In the example shown in FIG. 1, heater 32 includes a heating lamp positioned over bed 24. In other examples, heater 32 may include a resistive heater in the powder bed used alone or with a heating lamp.

Figure 2:
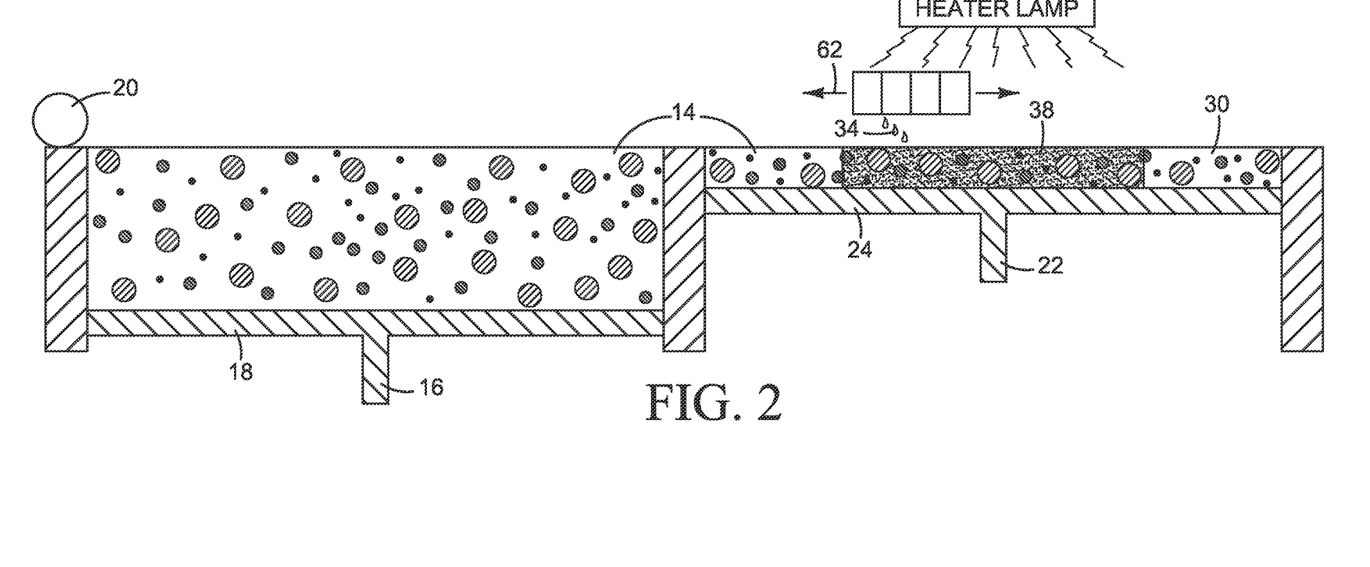
Figure 3:
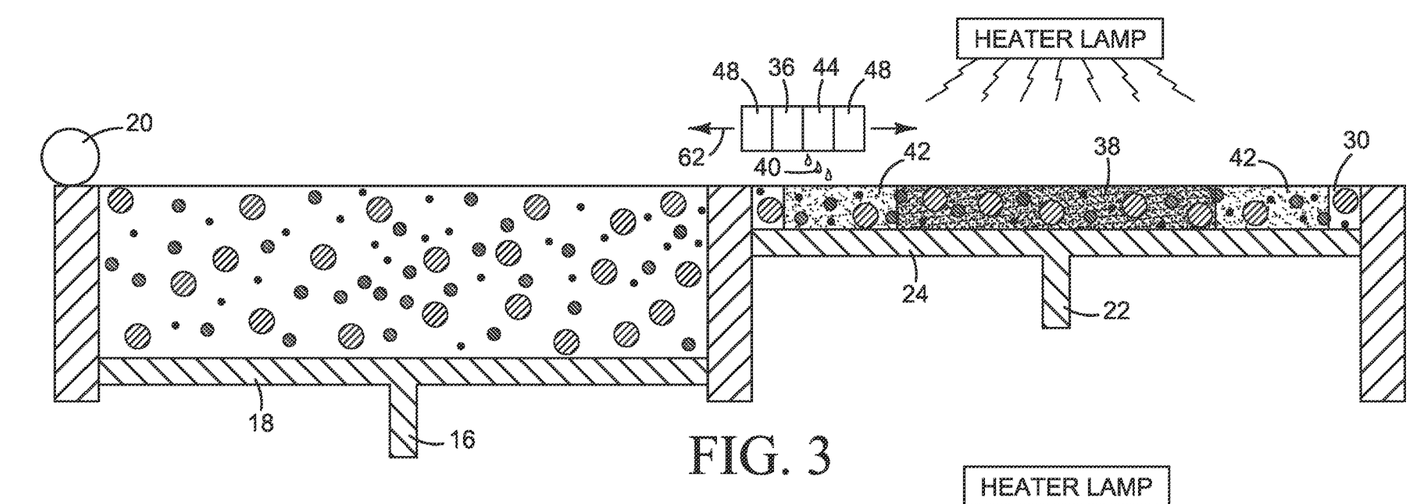

In FIG. 2, a coalescing agent 34 is dispensed on to build material 14 in layer 30 in a pattern corresponding to the first object slice (block 106 in FIG. 10), for example with an inkjet type dispenser 36. This pattern for coalescing agent 34 is depicted by an area 38 of dense stippling in the figures. If desired, a coalescence modifier agent 40 may be dispensed on to build material 14 in layer 30 for example with an inkjet type dispenser 44, as shown in FIG. 3 (block 108 in FIG. 10). Modifier agent 40 blocks or neutralizes the effects of the coalescing agent and may be applied before or after coalescing agent (or both before and after) to help control the degree of coalescence of targeted areas of build material for improved dimensional accuracy and overall quality of the manufactured object. In the example shown in FIG. 3, modifier agent 40 is dispensed on to an area 42 covering the area where a second object slice will overhang the first slice. Overhang area 42 covered by coalescence modifier agent 40 is depicted by light stippling in the figures. Coalescence modifier agent 40 may also be dispensed on to other areas of build material layer 30 to help define other aspects of the object slice, including interspersed with the pattern of the coalescing agent to change the material characteristics of the slice. Although two dispensers 36, 44 are shown, agents 34 and 40 could be dispensed from the same dispensers integrated into a single device, for example using different printheads (or groups of printheads) in a single inkjet printhead assembly.

Coalescing agent 34 includes a light absorbing component to absorb light to generate heat that sinters, melts or otherwise coalesces patterned build material 38. The rate of light absorption for different types of coalescing agents 34 will vary over different parts of the electromagnetic spectrum depending on the characteristics of the light absorbing component. For example, a yellow colorant may have a peak light absorption at about 450 nm wavelength light. A cyan colorant, by contrast, may have a peak light absorption at about 700 nm wavelength light. Black ink may have high absorption across a broad band of wavelengths compared to high absorption for yellow and cyan across narrow bands of wavelengths.

As noted above, it may not always be desirable to use black ink as a coalescing agent 34. However, because other colors absorb light across a narrower band of wavelengths, the time it takes to generate coalescing heat with a polychromatic, halogen lamp using cyan ink, for example, may be too long to be practical for additive manufacturing. Heating time may be reduced to practical levels for cyan and other color inks, and even for colorless inks, by using monochromatic light matching the color absorption band of coalescing agent 34. Thus, in FIG. 4, the area of layer 30 patterned with coalescing agent 34 is exposed to monochromatic light 46 from a light source 48 to coalesce build material patterned with coalescing agent 34, allowing the patterned build material to solidify and form first object slice 50 (block 110 in FIG. 10). In one example, as described in the more detail below, light source 48 is configured to emit monochromatic light 46 within a band of wavelengths that includes the peak light absorption of coalescing agent 34 with sufficient intensity to coalesce patterned build material. Any suitable light source 48 may be used to emit monochromatic light including, for example, LEDs, laser diodes and other sources that emit monochromatic light directly as well as light sources that emit monochromatic light by filtering, splitting, dispersing, refracting or otherwise producing monochromatic light from polychromatic light.

Figures 5, 6:
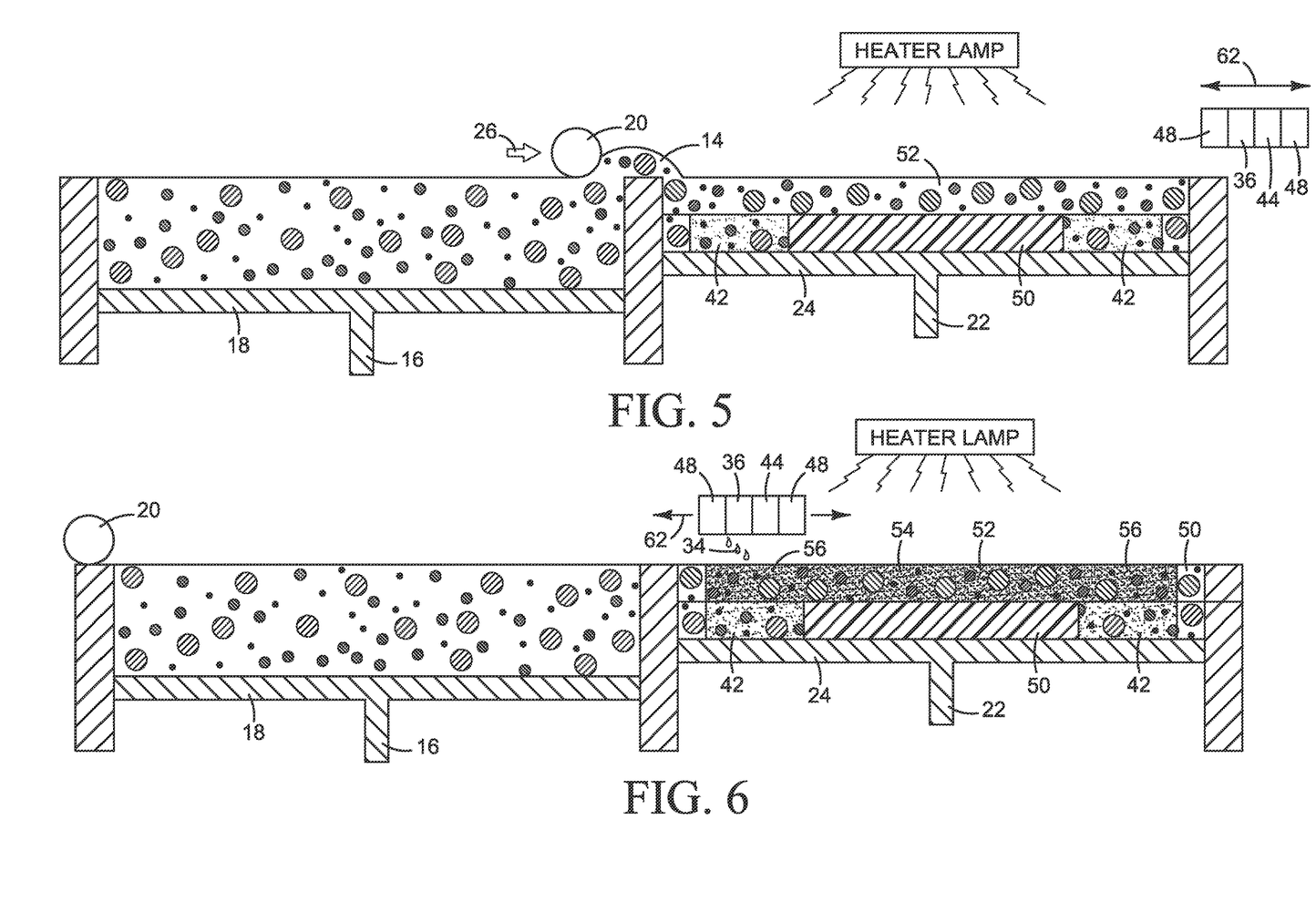

The process may be repeated for second and subsequent layers to form a multi-slice object. For example, in FIG. 5 a second layer 52 of build material 14 is formed in manufacturing bed 24 over first layer 30 (block 112 in FIG. 10) and pre-heated (block 114 in FIG. 10). In FIG. 6, a coalescing agent 34 is dispensed on to build material 14 in layer 52 in a pattern 54 corresponding to the second object slice (block 116 in FIG. 10), including along the edge of an area 56 overhanging first slice 50. In FIG. 7, a coalescence modifier agent 40 is dispensed on to build material 14 in layer 52 in area 58 to help prevent the unwanted coalescence and solidification of build material along the edge of the overhang (block 118 in FIG. 10). In FIG. 8, the area 54 of layer 52 patterned with coalescing agent 34 is exposed to monochromatic light 46 to coalesce build material and form second object slice 60 overhanging first slice 46 (block 120 in FIG. 10).

Agent dispensers 36 and 44 may be carried back and forth across manufacturing bed 24 together with light source 48, as indicated by arrows 62 in FIGS. 1-8, on a single carriage or on two or more separate carriages. Also, it may be possible in some implementations to use stationary agent dispensers 36, 44 and/or light sources 48. Coalescing agent 34 dispensed on to build material 14 in second layer 52 may be the same as or different from the coalescing agent dispensed on to first layer 30. Accordingly, monochromatic light 46 to coalesce patterned build material in second layer 52 may be the same or different wavelength from the light to coalesce patterned build material in first layer 30. Also, while distinct first and second slices 50 and 60 are shown in FIG. 8, the two slices actually fuse together into a single part upon coalescing and solidification of the second slice. The now fused slices 50, 60 may be removed from manufacturing bed 24 as a finished object 10 shown in FIG. 9. Although a simple two-slice object 10 is shown, the same process steps may be used to form more complex, multi-slice objects.

Figure 12:
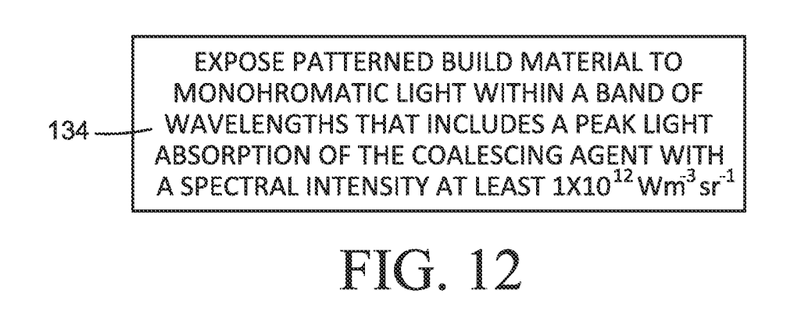
Figure 13:
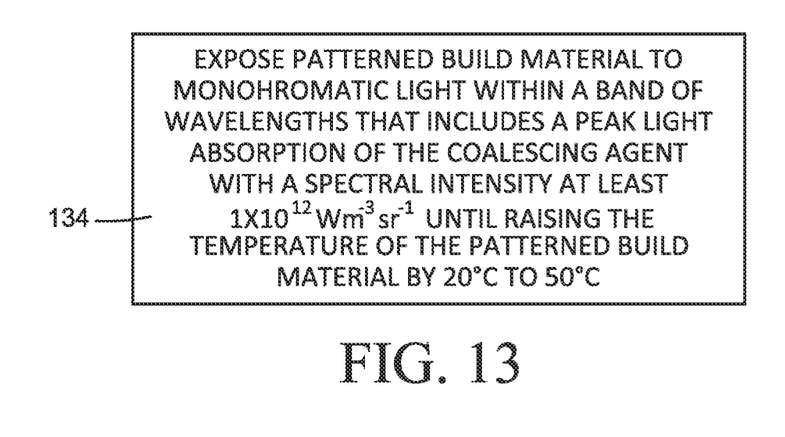

FIG. 11 illustrates another example of an additive manufacturing process 130. Referring to FIG. 11, a liquid coalescing agent is dispensed on to build material in a pattern corresponding to a slice (block 132) and patterned build material is exposed to monochromatic light within a band of wavelengths that includes a peak light absorption of the coalescing agent (block 134). The wavelength of the monochromatic light will vary depending on the peak absorption of the light absorbing component in the coalescing agent. Several examples are described below with reference to the graphs shown in FIGS. 14 and 15. Also, the intensity of the monochromatic light should be great enough to allow the patterned build material to reach a coalescing temperature within a practical period of time. Thus, as shown in FIG. 12, exposing patterned build material to monochromatic light in block 134 of FIG. 11 may be performed, for example, by exposing patterned build material to monochromatic light with a spectral intensity at least $1 \times 10^{12} \text{Wm}^{-3}\text{sr}^{-1}$. Referring to FIG. 13, in one specific example described below, exposing patterned build material to monochromatic light in block 134 of FIG. 11 may be performed by exposing patterned build material to monochromatic light with a spectral intensity at least $1 \times 10^{12} \text{Wm}^{-3}\text{sr}^{-1}$ to raise the temperature of the patterned build material 20° C. to 50° C. in a quite practical time of 1 second or less.

Figure 14:
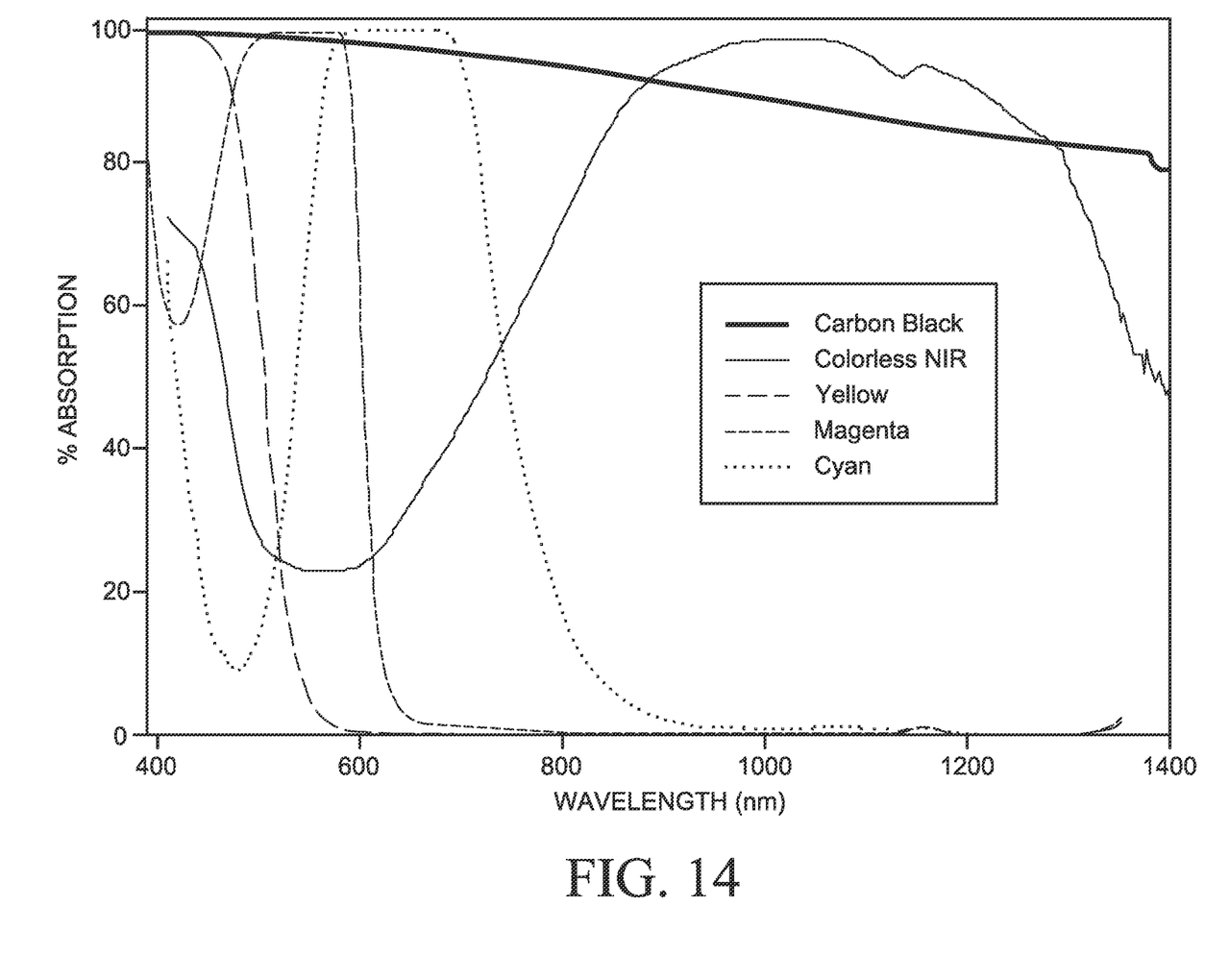
FIG. 14 is a graph showing one example of light absorption as a function of wavelength for black, yellow, magenta, cyan and colorless coalescing agents.

Several examples of coalescing agent and matching monochromatic light to generate coalescing heat are described below with reference to the graphs of FIGS. 14 and 15. FIG. 14 shows light absorption as a function of wavelength for black, yellow, magenta, cyan and colorless ink coalescing agents. A colorant acts as the light absorbing component in each ink which, for the color inks represented in FIG. 14, is a color pigment. The pigment based inkjet inks represented in FIG. 14 are commercially available from Hewlett-Packard Company as C8750 (black), C4905 (yellow), C4904 (magenta), and C4903 (cyan). A colorless dye acts as the light absorbing component in the colorless dye based ink represented in FIG. 14. Two such dyes are described in the PCT/US2014/057882 and PCT/US2014/057863 patent applications noted above.

Figure 15:
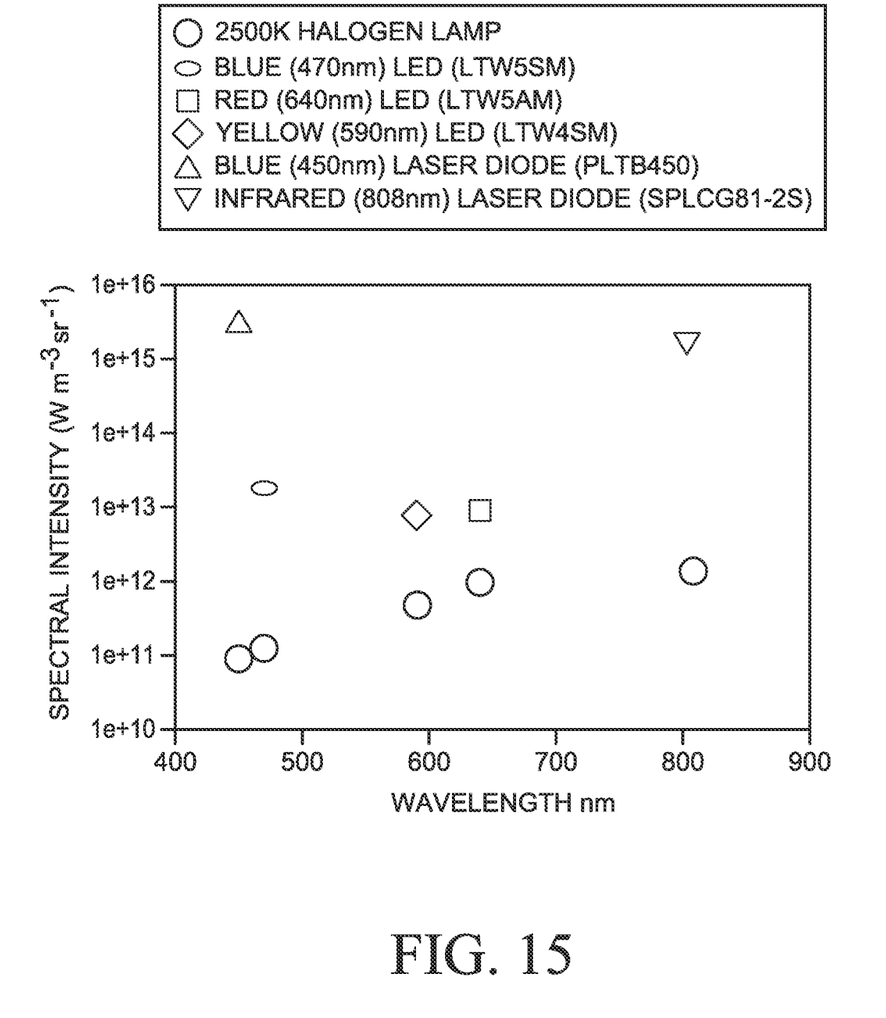
FIG. 15 is a graph showing one example of spectral intensity as a function of wavelength for monochromatic light sources that emit light near the peak absorptions of some of the coalescing agents shown in FIG. 14.

FIG. 15 shows spectral intensity as a function of wavelength for several examples of commercially available light sources that emit monochromatic light near the peak absorptions for the color coalescing agents shown in FIG. 14. (Suitable light sources that emit monochromatic light near the peak absorption for the colorless coalescing agent shown in FIG. 14 are not yet readily available commercially.) FIG. 15 also shows the spectral intensity of a 2500K halogen lamp relative to the monochromatic light sources.

A colorless ink such as that represented in FIG. 14 will absorb 60% or more light in the band of 800 nm to 1350 nm, including 808 nm light emitted by the infrared laser diode in FIG. 15. A yellow ink such as that represented in FIG. 14 will absorb 60% or more light in the band of 380 nm to 500 nm, including the 450 nm light emitted by the blue laser diode and the 470 nm light emitted by the blue LED in FIG. 15. A magenta ink such as that represented in FIG. 14 will absorb 60% or more light in the band of 420 nm to 600 nm, including the 590 nm light emitted by the yellow LED in FIG. 15. A cyan ink such as that represented in FIG. 14 will absorb 60% or more light in the band of 520 nm to 700 nm, including the 590 nm light emitted by the yellow LED and the 640 nm red LED in FIG. 15. A black ink such as that represented in FIG. 14 will absorb 60% or more light across the full spectrum of visible light (380 nm to 700 nm), including light emitted by any of the color LEDs and laser diodes in FIG. 15.

As shown in FIG. 15, the spectral intensity of the monochromatic light is significantly higher at or near peak absorption than the spectral intensity of the polychromatic light emitted by a 2500K halogen lamp. It has been demonstrated that monochromatic light sources such as the LEDs and laser diodes represented in FIG. 15 produce enough energy to generate the heat needed to coalesce polymer build materials when matched to the proper light absorbing component in the coalescing agent. In one example, a nylon 12 build material powder that coalesces at about 185° C. is pre-heated to about 150° C., patterned with a yellow ink from FIG. 14, and exposed to a blue LED emitting 470 nm light from a distance less than 2 cm. The yellow ink absorbing nearly 100% of the incident light should generate sufficient heat to reach the coalescing temperature of about 185° C. at least 10 times faster than with a 2500K halogen lamp. If the patterned build material is exposed to a blue laser diode emitting 450 nm light, the coalescing temperature may be reached even faster. While the threshold absorption for adequate heating will vary depending on the build material and the monochromatic light source, it is expected that sufficient heat may be generated in an exposure time less than 1 second if the coalescing agent absorbs incident light at a rate of 60% or more for matching light with a spectral intensity at least $1 \times 10^{12} \text{Wm}^{-3}\text{sr}^{-1}$.

Figure 16:
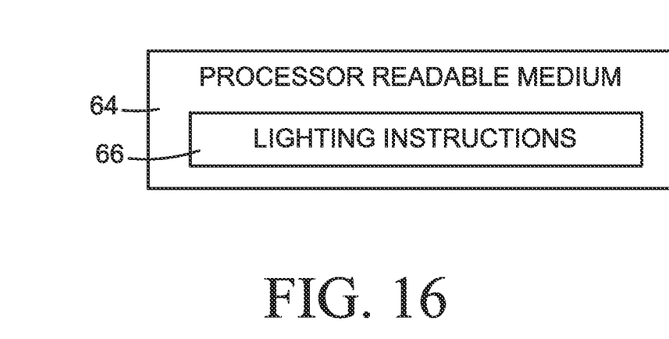
FIG. 16 illustrates one example of a processor readable medium with lighting instructions for additive manufacturing.

FIG. 16 is a block diagram illustrating a processor readable medium 64 with instructions 66 to control lighting during the manufacture of a 3D object. A processor readable medium 64 is any non-transitory tangible medium that can embody, contain, store, or maintain instructions for use by a processor. Processor readable media include, for example, electronic, magnetic, optical, electromagnetic, or semiconductor media. More specific examples of suitable processor readable media include a hard drive, a random access memory (RAM), a read-only memory (ROM), memory cards and sticks and other portable storage devices.

Lighting instructions 66 include instructions to control monochromatic lighting during the manufacture of a 3D object, for example by exposing patterned build material to monochromatic light at block 134 in FIG. 11-13. Instructions 66 may include other lighting instructions, for example instructions to pre-heat build material at block 104 in FIG. 10 with a heating lamp 32 in FIGS. 1-8. Processor readable medium 64 with instructions 66 may be implemented, for example, in a CAD computer program product, in an object model processor, or in a controller for an additive manufacturing machine. Control data to inhibit solidification can be generated, for example, by processor readable instructions on the source application, usually a CAD computer program product, in an object model processor, or by processor readable instructions on the additive manufacturing machine.

Figure 17:
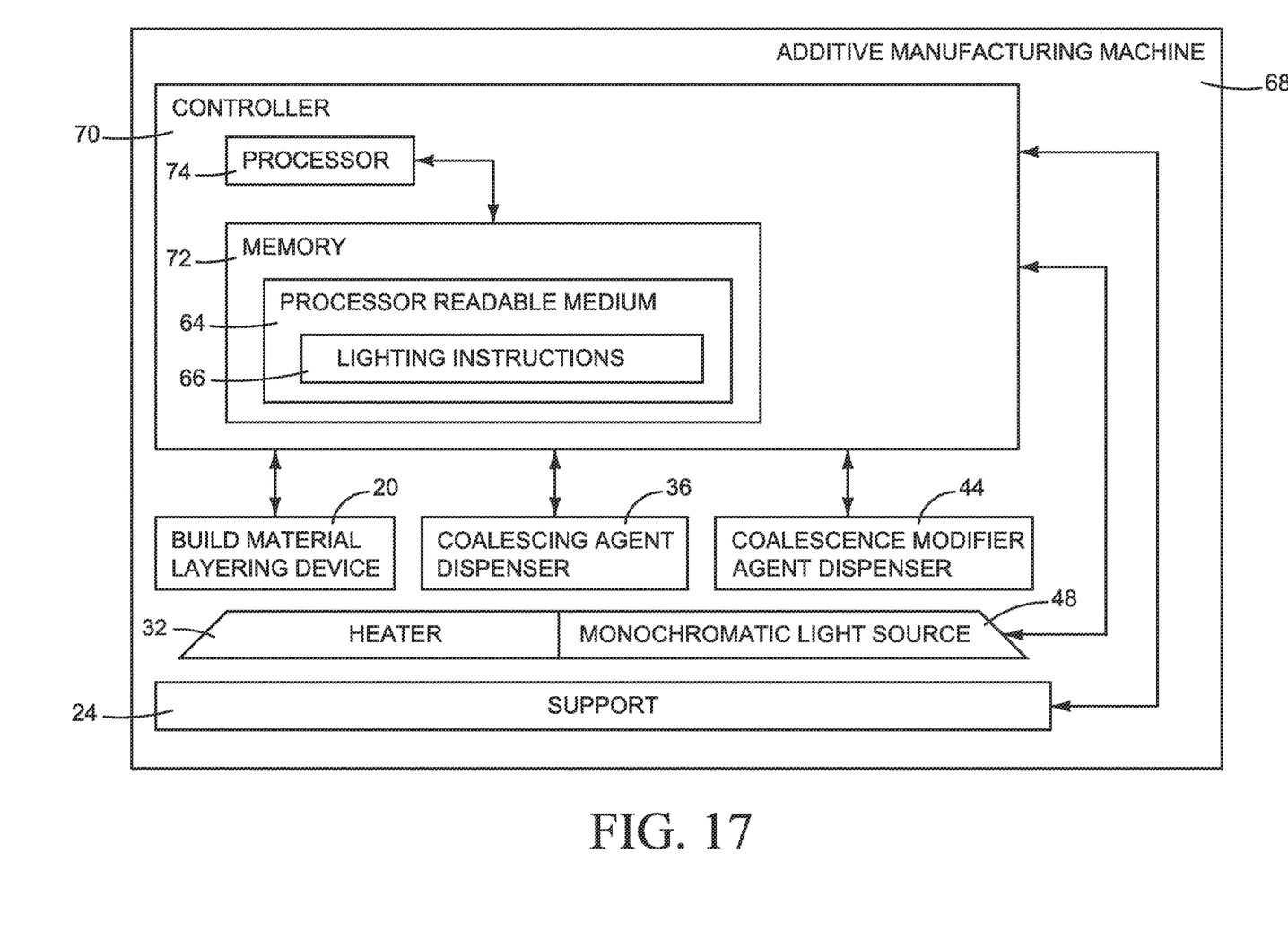
FIG. 17 is a block diagram illustrating one example of an additive manufacturing machine implementing a controller that includes a processor readable medium with lighting instructions, such as the medium shown in FIG. 16.

FIG. 17 is a block diagram illustrating one example of an additive manufacturing machine 68 implementing a controller 70 with lighting instructions 66. Referring to FIG. 17, machine 68 includes controller 70, a manufacturing bed or other suitable support 24, a roller or other suitable build material layering device 20, a coalescing agent dispenser 36, a coalescence modifier agent dispenser 44, a heater 32 and a light source 48. The in-process object structure is supported on support 24 during manufacturing. In some machines 68, support 24 is movable at the urging of controller 70 to compensate for the changing thickness of the in-process structure, for example as layers of build material are added during manufacturing.

Build material layering device 20 layers build material on support 24 and on the in-process structures and may include, for example, a device to dispense the build material and a blade or roller to distribute the build material uniformly to the desired thickness for each layer. Coalescing agent dispenser 36 dispenses coalescing agent selectively at the direction of controller 70 on to build material, for example as described above with reference to FIGS. 2 and 6. Coalescence modifier agent dispenser 44 dispenses modifier agent selectively at the direction of controller 70 on to build material, for example as described above with reference to FIGS. 3 and 7. While any suitable dispensers 36, 44 may be used, inkjet printheads are often used in additive manufacturing machines because of the precision with which they can dispense agents and their flexibility to dispense different types and formulations of agents. Manufacturing machine 68 may include a heater 32 if it is desired to pre-heat the build material. Manufacturing machine 36 includes a light source 48 to apply light energy to coalesce build material treated with coalescing agent, for example as described above with reference to FIGS. 5 and 8.

Controller 70 represents the processor (or multiple processors), the associated memory (or multiple memories) and instructions, and the electronic circuitry and components needed to control the operative elements of machine 68. In particular, controller 70 includes a memory 72 having a processor readable medium 64 with lighting instructions 66 and a processor 74 to read and execute instructions 66. For example, controller 70 would receive control data and other instructions from a CAD program to make an object and execute local lighting instructions 66 as part of the process of making the object.

Figure 18:
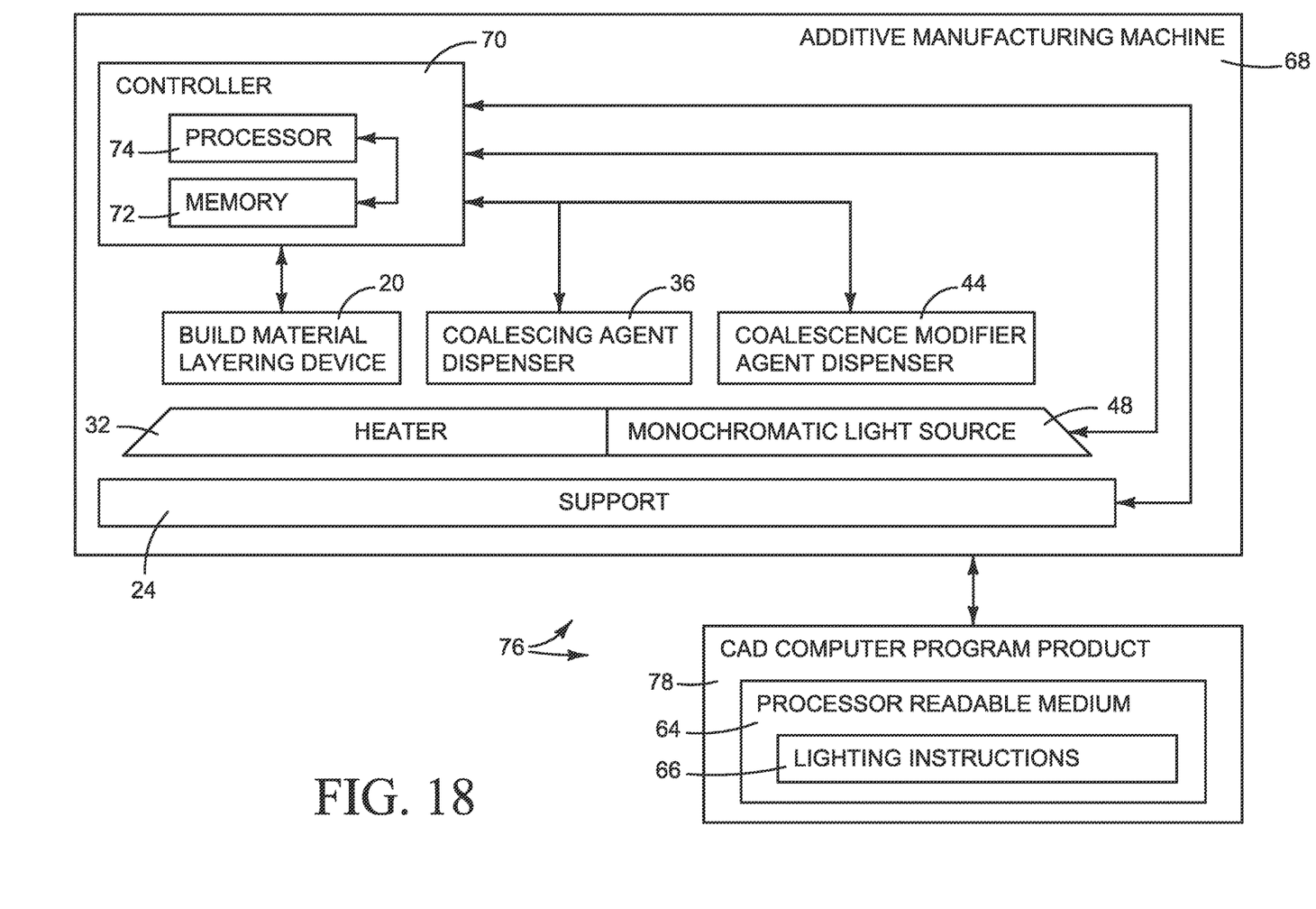
FIG. 18 is a block diagram illustrating one example of an additive manufacturing system implementing a CAD computer program product that includes a processor readable medium with lighting instructions, such as the medium shown in FIG. 16.

Alternatively, lighting instructions 66 may be embodied in a processor readable medium 64 separate from controller 70, for example as part of a CAD computer program product shown in FIG. 18. Referring to FIG. 18, an additive manufacturing system 76 includes an additive manufacturing machine 68 operatively connected to a CAD computer program product 78 with lighting instructions 66 residing on a processor readable medium 64. Any suitable connection between machine 68 and CAD program product 78 may be used to communicate instructions and control data to machine 68 including, for example, a wired link, a wireless link, and a portable connection such as a flash drive or compact disk.

Figure 4:
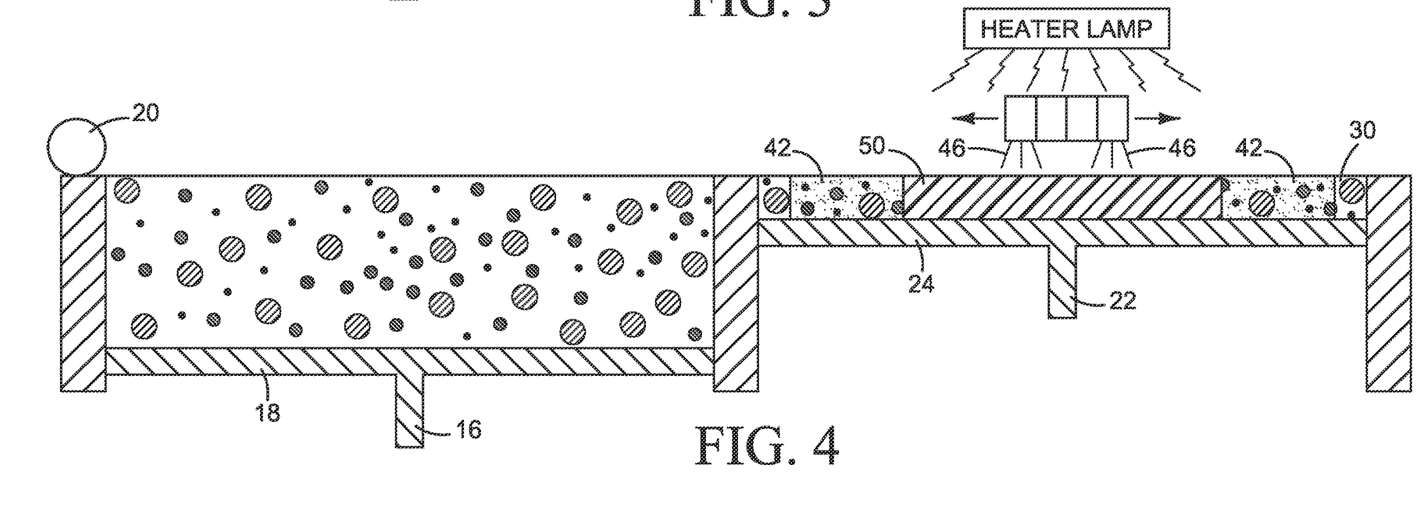
Figure 19:
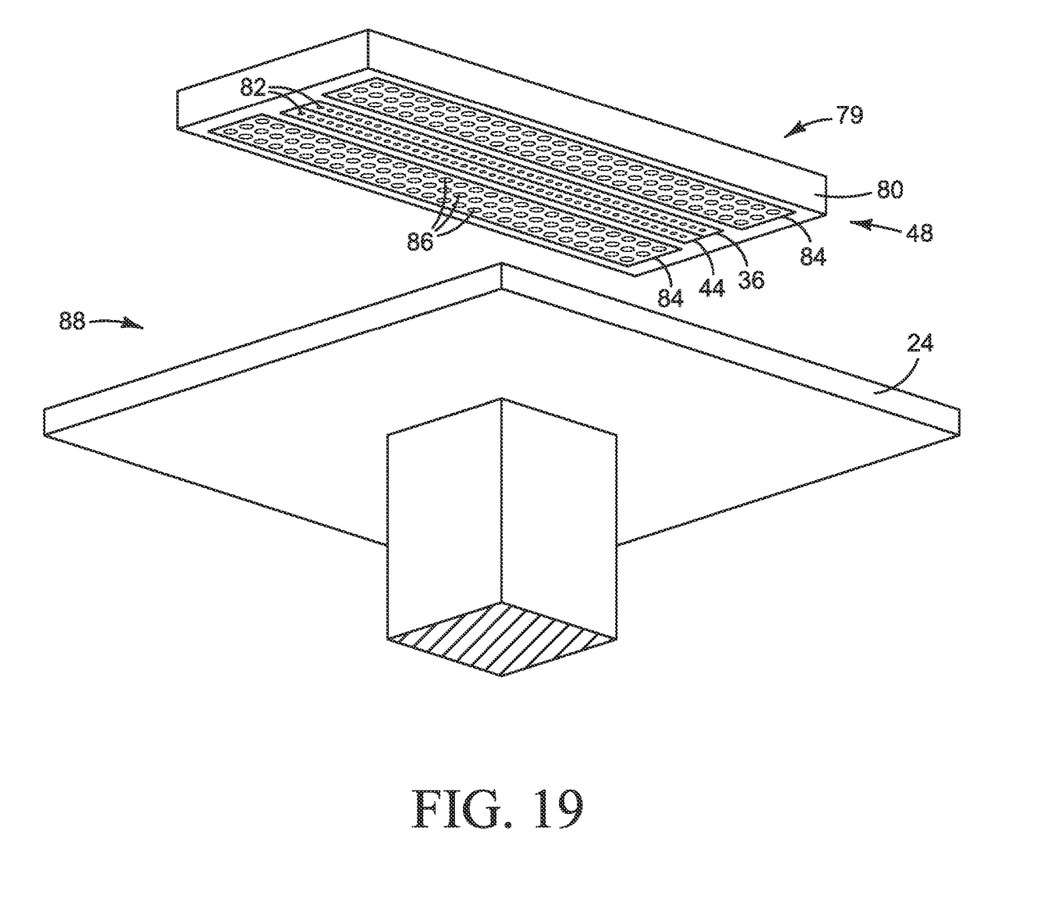
FIG. 19 illustrates one example of a carriage assembly with a coalescing agent dispenser and a monochromatic light source for an additive manufacturing machine, such as the machine shown in FIG. 17 or FIG. 18.

FIG. 19 illustrates one example of a carriage assembly 79 for an additive manufacturing machine such as machine 68 shown in FIGS. 17 and 18. Referring to FIG. 19, carriage assembly 79 includes a carriage 80 carrying agent dispensers 36, 44 and a light source 48. Carriage 80 is movable back and forth over manufacturing bed 24 to dispense coalescing and modifier agents 34, 40, for example as shown in FIGS. 2-3 and 6-7, and to expose patterned build material to monochromatic light 46, for example as shown in FIGS. 4 and 8. In the example shown in FIG. 19, agent dispensers 36 and 44 are configured as elongated inkjet printheads that span the width of bed 24 with an array of nozzles 82 through which the agents are dispensed on to build material supported on bed 24, or that span so much of the width of bed 24 corresponding to a build zone 88 for layering and coalescing the build material. While two printheads 36, 44 with only a single line of dispensing nozzles are shown, other configurations are possible. For example, more or fewer printheads could be used each with a different array of dispensing nozzles, including printheads and nozzles to dispense multiple different color (or colorless coalescing agents.

Also, in the example shown, light source 48 is configured as a pair of light bars 84 that span the width of bed 24 with an array of individually addressable LEDs, laser diodes or other monochromatic light sources 86, or that span so much of the width of bed 24 corresponding to a build zone 88 for layering and coalescing the build material. Each of the light sources 86 or each of multiple groups of the light sources 86 is individually addressable in the array to emit light selectively independent of any other light source in the array or of any other group of light sources in the array. Each light bar 84 is positioned outboard of agent dispensers 36, 44 to enable illuminating patterned build material on bed 24 immediately after dispensing an agent 34, 40, if desired, when carriage 80 is moving in either direction across bed 24. Individual light sources 86 may be energized selectively at the direction of the controller 70 to illuminate only patterned build material to limit unwanted effects on surrounding build material and to reduce power consumption. In addition, each light bar 84 may include a single set of monochromatic lights (only one wavelength band) corresponding to coalescing agents with absorption peaks within that band, or multiple sets of lights (multiple wavelength bands) to accommodate a greater range of coalescing agents. Other suitable lighting configurations are possible. For example, light source 48 may be supported on a carriage distinct from the carriage supporting the agent dispenser(s). For another example, light source 48 may be configured as a stationary array of monochromatic light sources 86 covering build zone 88.

In one example, each light bar 84 includes a line of monochromatic red light sources, a line of monochromatic green light sources and a line of monochromatic blue light sources to cover corresponding absorption peaks for cyan, magenta, and yellow coalescing agents, respectively. Lines or other arrays of multiple monochromatic light sources enable manufacturing an object with different color parts using a single light source 48. Thus, for example, a first color (or colorless) coalescing agent 34 may be dispensed at block 106 in FIG. 10 and exposed to a corresponding first color (or colorless) monochromatic light 46 at block 110, and a second color (or colorless) coalescing agent 34 dispensed at block 116 and exposed to a corresponding second color (or colorless) monochromatic light 46 at block 120. Other processes are possible. For another example, dispensing a coalescing agent at one or both blocks 106 and 116 may include patterning build material with multiple, different coalescing agents 34 and exposing the different patterns to corresponding multiple, different monochromatic light 46 to obtain different colors within the same layer of build material.

While a powdered polymer build material is often used for additive manufacturing, other suitable build materials may be used, including metals and other non-polymers and/or liquids, pastes, and gels. Suitable coalescing agents include water or solvent based dispersions with a light absorbing component. As one example, the coalescing agent may be an ink that includes colored or colorless pigments or dyes as the light absorbing component.

Suitable coalescence modifier agents may separate individual particles of the build material to prevent the particles from joining together and solidifying as part of the slice. Examples of this type of coalescence modifier agent include colloidal, dye-based, and polymer-based inks, as well as solid particles that have an average size less than the average size of particles of the build material. The molecular mass of the coalescence modifier agent and its surface tension should be such that it enables the agent to penetrate sufficiently into the build material to achieve the desired mechanical separation. In one example, a salt solution may be used as a coalescence modifier agent. In other examples, inks commercially known as CM996A and CN673A available from Hewlett-Packard Company may be used as a coalescence modifier agent. Suitable coalescence modifier agents may act to modify the effects of a coalescing agent by preventing build material from reaching its coalescing temperature during heating. A fluid that exhibits a suitable cooling effect may be used as this type of coalescence modifier agent. For example, when build material is treated with a cooling fluid, heat in the build material may be absorbed evaporating the fluid to help prevent build material from reaching its coalescing temperature. Thus, for example, a fluid with a high water content may be a suitable coalescence modifier agent. Other types of coalescence modifier agent may be used.

"A" and "an" used in the Claims means one or more.

The examples shown in the figures and described above illustrate but do not limit the scope of this disclosure, which is defined in the following Claims.

What is claimed is:

1. A lighting device for an additive manufacturing machine, comprising an array of light sources each to emit monochromatic light within a band of wavelengths that includes a peak light absorption of a liquid coalescing agent to be dispensed on to layered build material, each of the light sources or each of multiple groups of the light sources individually addressable in the array to emit light independent of any other light source in the array or of any other group of light sources in the array, and where each of the light sources is a single light source to emit monochromatic light with a spectral intensity of at least $1\times10^{12} Wm^{-3} sr^{-1}$.

2. The device of claim 1, where the array has a dimension at least as large as a corresponding dimension of a build zone in the additive manufacturing machine.

3. The device of claim 1, where:
the coalescing agent is one or more of a colorless ink that absorbs at least 60% of light having a wavelength in a range of 800 nm to 1350 nm, a yellow ink that absorbs at least 60% of light having a wavelength in a range of 380 nm to 500 nm, a magenta ink that absorbs at least 60% of light having a wavelength in a range of 420 nm to 600 nm, a cyan ink that absorbs at least 60% of light have a wavelength in a range of 520 nm to 700 nm, and/or a black ink that absorbs at least 60% of light having a wavelength in a range of 380 nm to 700 nm; and each of the light sources includes one or more of a monochromatic light source to emit light in the range of 800 nm to 1350 nm, 380 nm to 500 nm, 420 nm to 600 nm, 520 nm to 700 nm, and/or 380 nm to 700 nm.

4. The device of claim 3, where:
the coalescing agent is a colorless ink that absorbs at least 60% of light having a wavelength in the range of 800 nm to 1350 nm; and
each of the light sources includes a monochromatic light source to emit light in the range of 800 nm to 1350 nm.

5. The device of claim 3, where:
the coalescing agent is a yellow ink that absorbs at least 60% of light having a wavelength in the range of 380 nm to 500 nm; and
each of the light sources includes a monochromatic light source to emit light in the range of 380 nm to 500 nm.

6. The device of claim 3, where:
the coalescing agent is a magenta ink that absorbs at least 60% of light having a wavelength in the range of 420 nm to 600 nm; and
each of the light sources includes a monochromatic light source to emit light in the range of 420 nm to 600 nm.

7. The device of claim 3, where:
the coalescing agent is a cyan ink that absorbs at least 60% of light have a wavelength in the range of 520 nm to 700 nm; and
each of the light sources includes a monochromatic light source to emit light in the range of 520 nm to 700 nm.

8. The device of claim 3, where:
the coalescing agent is a black ink that absorbs at least 60% of light having a wavelength in the range of 380 nm to 700 nm; and
each of the light sources includes a monochromatic light source to emit light in the range of 380 nm to 700 nm.

9. A carriage assembly for an additive manufacturing machine, comprising:
a movable carriage to move over a build zone;
a coalescing agent dispenser on the carriage to dispense a liquid coalescing agent on to build material in the build zone; and
an array of light sources on the carriage with the dispenser each to emit monochromatic light within a band of wavelengths that includes a peak light absorption of the liquid coalescing agent dispensed on to layered build material in the build zone, each of the light sources or each of multiple groups of the light sources individually addressable in the array to emit light independent of any other light source in the array or of any other group of light sources in the array, and where each of the light sources is a single light source to emit monochromatic light with a spectral intensity of at least $1\times10^{12} Wm^{-3} sr^{-1}$.

10. The assembly of claim 9, comprising a coalescence modifier agent dispenser on the carriage to dispense a liquid coalescence modifier agent on to build material in the build zone.

11. The assembly of claim 10, where each dispenser comprises an inkjet printhead.

12. An additive manufacturing machine, comprising:
a first device to layer powdered build material;
a second device to dispense a liquid coalescing agent;
a third device to dispense a liquid coalescing modifier agent;
an array of light sources each to emit monochromatic light within a band of wavelengths that includes a peak light absorption of the liquid coalescing agent, each of the light sources or each of multiple groups of the light sources individually addressable in the array to emit light independent of any other light source in the array or of any other group of light sources in the array, and where each of the light sources is a single light source to emit monochromatic light with a spectral intensity of at least $1\times10^{12}Wm^{-3}sr^{-1}$; and
a controller to execute instructions to:
cause the first device to layer the powdered build material;
cause the second device to dispense the liquid coalescing agent on to a layer of the powdered build material in a pattern of a slice;
cause the third device to dispense the liquid coalescing modifier agent on to the layer of the powdered build material bordering the patterned build material, on to the patterned build material, or on to the layer of the powdered build material bordering the patterned build material and on to the patterned build material; and
cause light sources in the array to illuminate the patterned build material with monochromatic light within the band of wavelengths that includes the peak light absorption of the liquid coalescing agent.

13. The machine of claim 11, where:
the second device is to dispense one or more of a colorless coalescing agent that absorbs at least 60% of light having a wavelength in a the range of 800 nm to 1350 nm, a yellow coalescing agent that absorbs at least 60% of light having a wavelength in a range of 380 nm to 500 nm, a magenta coalescing agent that absorbs at least 60% of light having a wavelength in a range of 420 nm to 600 nm, a cyan coalescing agent that absorbs at least 60% of light have a wavelength in a range of 520 nm to 700 nm, and/or a black coalescing agent that absorbs at least 60% of light having a wavelength in a range of 380 nm to 700 nm; and
each of the light sources includes one or more of a monochromatic light source to emit light in the range of 800 nm to 1350 nm, 380 nm to 500 nm, 420 nm to 600 nm, 520 nm to 700 nm, and/or 380 nm to 700 nm.

\* \* \* \* \*